United States Patent [19]
Powell

[11] 4,435,710
[45] Mar. 6, 1984

[54] SYSTEM FOR OBSCURING ANTENNA SIDELOBE SIGNALS

[75] Inventor: Norman F. Powell, Howard, Md.

[73] Assignee: Westinghouse Electric Corp., Pittsburgh, Pa.

[21] Appl. No.: 253,322

[22] Filed: Mar. 31, 1981

[51] Int. Cl.³ .............................................. G01S 7/36
[52] U.S. Cl. .................................................. 343/18 E
[58] Field of Search ................................... 343/18 E

[56] References Cited

U.S. PATENT DOCUMENTS 4,143,375  3/1979  Knopf .............................. 343/18 E Primary Examiner—T. H. Tubbesing
Attorney, Agent, or Firm—J. B. Hinson

[57] ABSTRACT

The invention comprises a jam resistant radar system. The system comprises a primary radar transmitter which is coupled to a primary antenna having a predominant main beam and sidelobes. A second wide beam antenna is coupled to a second radar transmitter which transmits a signal having a frequency spectrum encompassing the main beam with the power density being substantially equal to the power density of the sidelobes of the primary antenna. The second transmitter is frequency modulated over a spectrum in discrete steps while the primary transmitter is pulse-to-pulse or look-to-look randomly modulated over the spectrum. This prevents a listening jammer positioned in the sidelobes from determining the pulse-to-pulse or look-to-look frequency being used by the primary radar transmitter.

4 Claims, 2 Drawing Figures

SYSTEM FOR OBSCURING ANTENNA SIDELOBE SIGNALS

GOVERNMENT CONTRACT CLAUSE

The Government has rights in this invention pursuant to Contract No. F33657-76-C-0069 awarded by the Department of the Air Force.

BACKGROUND OF THE INVENTION

1. Field of the Invention

The invention relates to radar systems and more particularly to a radar system which includes a main transmitter and an auxiliary transmitter with the auxiliary transmitter transmitting a signal which obscures the characteristics of the main radar transmitter.

2. Description of the Prior Art

Jamming techniques are more effective if the characteristics of the radar to be jammed are known. Information relative to the characteristics of the conventional radar system may be obtained using a receiver positioned in either the main beam or in the sidelobes.

Prior art radar systems have typically used one of several techniques to reduce the susceptibility to jamming. These include frequency diversity with pseudo-random frequency selection techniques. Low sidelobe antennas were also used to narrow the beamwidth and make it more difficult to receive sufficient energy in the sidelobes to detect the radar signal and determine its transmission characteristics. Another suggested technique has been to utilize an antenna array and adapt the beam pattern so that the jamming transmitter was positioned in a null of the array. All of these systems utilize some modification of the main radar beam as a technique to make it more resistant to jamming. By contrast, the present system utilizes an auxiliary signal to obscure the sidelobes to make it difficult for a potential jammer to determine the characteristics of the radar. As a result, effective jamming requires that the jamming signal be spread over the entire possible frequency spectrum of the radar system to be jammed in order to be sure that the jamming signal includes the instantaneous spectrum of the radar transmitter.

SUMMARY OF THE INVENTION

The invention comprises a radar system which includes a primary transmitter operating in a selected frequency spectrum coupled to an antenna to radiate a signal having a main beam and sidelobes. An auxiliary transmitter having a frequency spectrum which includes the frequency spectrum utilized by the main transmitter is coupled to an antenna to radiate a signal which obscures the sidelobes of the main transmitter.

DESCRIPTION OF THE PREFERRED EMBODIMENT

Figure 1:
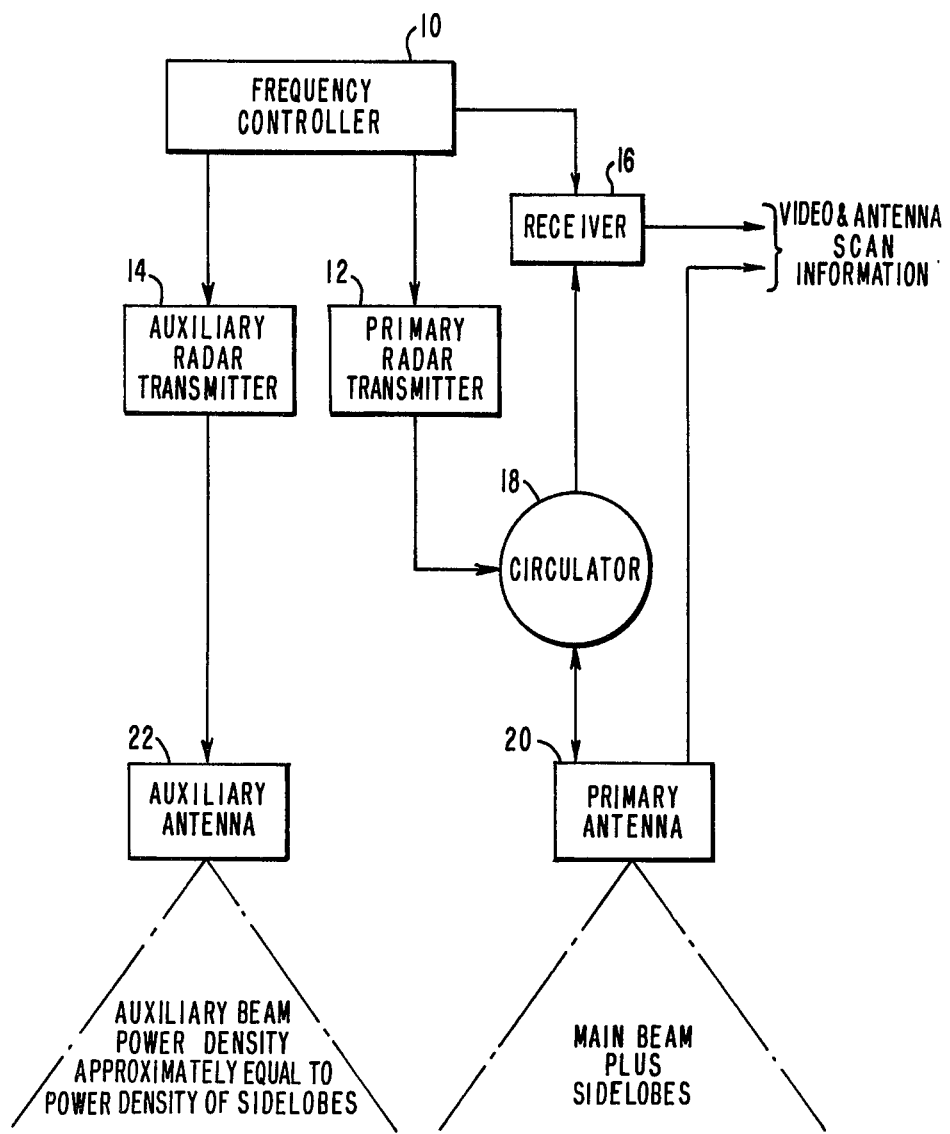
FIG. 1 is a block diagram of the preferred embodiment of the invention.

The preferred embodiment of the invention is illustrated in FIG. 1. A frequency controller 10 generates control signals which are coupled to the primary radar transmitter 12, the auxiliary radar transmitter 14 and the receiver 16. In response to these signals, the primary and auxiliary radar transmitters 12 and 14 generate RF signals having the proper frequency and power level. The receiver 16 is tuned to receive the return signal of the primary radar transmitter 12.

The RF output signal of the radar transmitter 12 is coupled through a conventional circulator 18 to the primary antenna 20. Preferably the primary antenna 20 is of the low sidelobe design to transmit a signal having a high power density in the main lobes and relatively low power density in the sidelobes. Return signals are also received by the primary antenna 20 and coupled through the circulator 18 to the RF input port of the receiver 16. The return signals are demodulated by the receiver 16 to produce radar video signals which are coupled to various conventional devices such as displays and processors. The primary antenna 20 will also provide antenna scan information to these systems in a conventional manner.

The RF output signal of the auxiliary radar transmitter 14 is coupled to an auxiliary antenna 22 to produce an auxiliary radar beam having a power density of which approximates or exceeds the power density of the sidelobes of the main beam. The primary antenna and the auxiliary antenna 22 are scanned synchronously and in the preferred embodiment would be mechanically coupled so that they are always transmitting in the same direction. The frequency spectrum and modulation of the primary and auxiliary radar transmitters 12 and 14 are selected to obscure the sidelobes of the primary radar system. In the preferred embodiment, this technique for obscuring the sidelobes is effective because each subperiod of the auxiliary transmitter 14 is substantially equal to the duration of the pulse transmitted by the primary transmitter 12 and in the sidelobes of the primary transmitter 14, the signals from the primary and auxiliary transmitters 12 and 14, have approximately the same power density and the frequency spectrum of the auxiliary transmitter 14 covers most of or exceeds the frequency spectrum of the primary transmitter 12.

Figure 2:
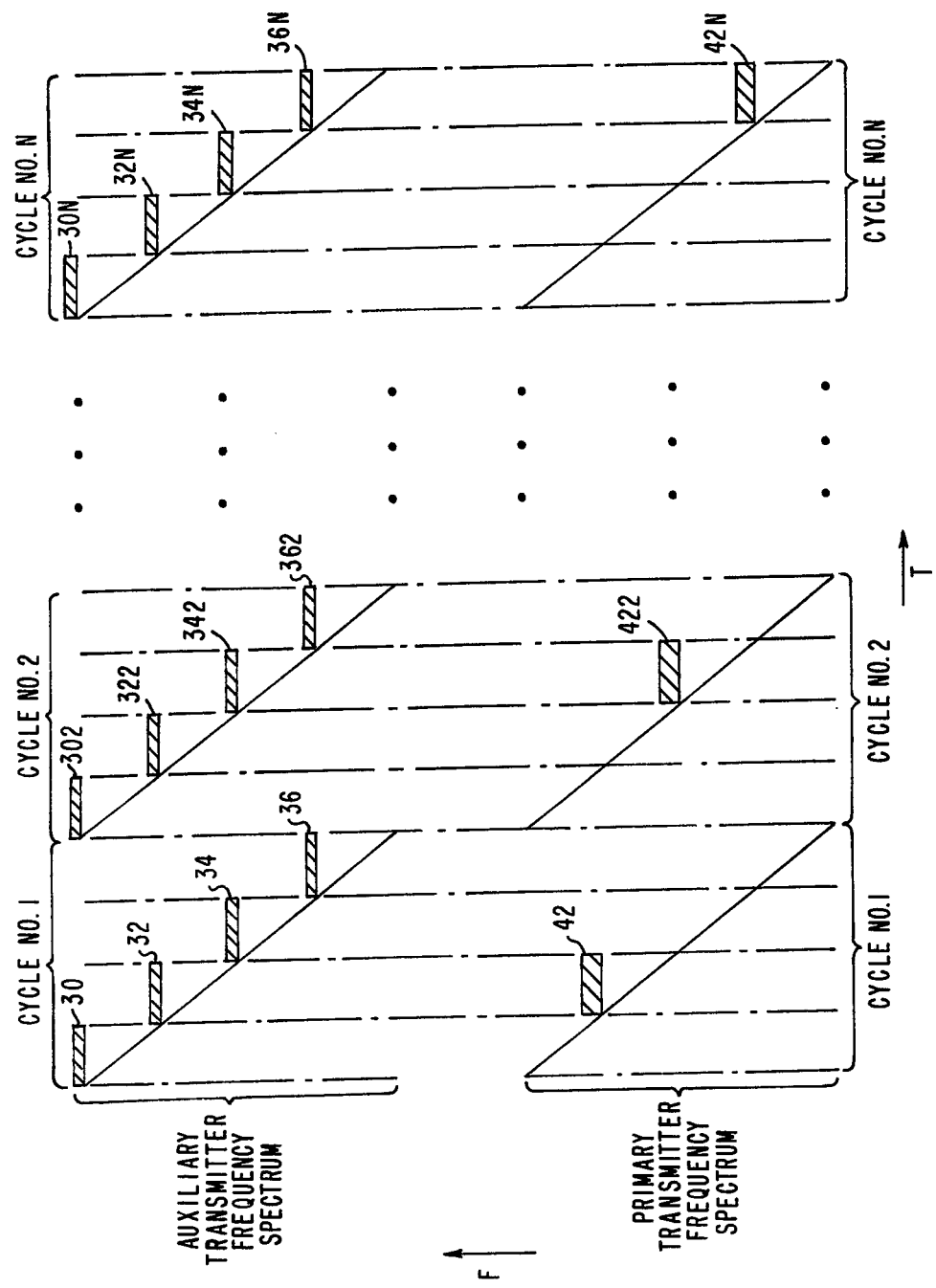
FIG. 2 is a diagram illustrating the frequency spectrum of the main and auxiliary radar transmitters.

FIG. 2 is a diagram illustrating the frequency spectrum of the preferred embodiments of the primary and auxiliary transmitters. Both the primary and auxiliary transmitters are cyclically frequency modulated with the cycles illustrated having the same period although this is not technically a necessity. That is to say that the cycle of the primary and auxiliary transmitters may be different and that the period of either or both, the primary and auxiliary transmitters, may be changed on a dynamic basis In FIG. 2, three typical cycles of the auxiliary transmitter 14 are labeled cycle 1, cycle 2 and cycle n. These cycles are typical in that all other cycles of the auxiliary transmitter may be identical to the ones illustrated. Each of the cycles have been subdivided into four subperiods of equal time duration with the auxiliary transmitter 14 transmitting a substantially constant frequency within each of these subperiods. Specifically, these periods of constant frequency are illustrated at reference numerals 30, 32, 34 and 36. Subperiods for the second period are identified by reference numerals 302, 322, 342 and 362. Similar subperiods for the $n^{th}$ cycle are identified at reference numerals 30n, 32n, 34n and 36n. Each of the cycles may be subdivided into any convenient number of subperiods. In fact the more subperiods used the more effective is the anti-jamming characteristic of the system. The maximum and minimum frequency of the RF signal is selected to be substantially equal to or exceed the entire spectrum of the primary transmitter 12.

As illustrated in FIG. 2 the spectrum of the RF signal of the primary transmitter 12 is frequency modulated on a cyclically basis. Three modulation cycles labeled cycle 1, cycle 2 and cycle n have been illustrated with these being typical in that all other cycles may be essentially identical to the ones illustrated. It should also be emphasized that it is not necessary that each modulation be of the same time duration.

During each of the modulation cycles the primary transmitter 12 will transmit a relatively high power pulse signal with the frequency being constant and selected within the permissible frequency range at random either pulse-to-pulse or look-to-look. Such a typical pulse is illustrated for cycle 1 at reference numeral 42 and for cycle 2 at reference numeral 422. Similarly, for cycle n the energy pulse is illustrated at reference numeral 42n. These pulses are typical as previously explained in that all other cycles may be identical.

Radar transmitters having the capability of being modulated as described above with reference to the primary and auxiliary transmitters 12 and 14, are referred to as frequency agile and are well known in the art. Suitable antennas, circulators and receivers are also well known in the art, or can be easily constructed using well known circuit techniques. Therefore, no structural details of these components have been illustrated.

The above-described technique for increasing the resistance to jamming is particularly well adapted to systems having low sidelobes in that the low antenna sidelobe gain provides a basis for obscuring the sidelobes of the primary transmitter 12 without requiring high power. The amount of average power required from the auxiliary transmitter 14 is related to the average power of the primary transmitter 12 by the following relationship.

$$\frac{P_d}{P_r} = \frac{Nk_r}{G_d/G_s}$$

In the above equation, $P_d/P_r$ is the ratio of the power output of the primary and the auxiliary transmitters 12 and 14; N is the number of discrete frequencies within the cycle of the auxiliary transmitter; $P_r$ is the average power of the primary transmitter; $G_d$ is the sidelobe gain of the main antenna; $G_s$ is the gain of the auxiliary antenna; and $k_r$ is the ratio by which the deception signal exceeds and radar signal. Utilizing a system of this type, it is possible to achieve a 15 dB signal to jamming gain with a primary transmitter having a 10 Kw level and the auxiliary transmitter having only 60 watts.

As previously discussed, the system described above can be constructed using available components and techniques. For example, transmitter capable of being modulated to generate signals having the required frequency spectrums are well known. Antennas, circulators, and receivers having the required characteristics are also well known. Similarly, techniques for processing the video data are well known. Therefore, these functions have been illustrated and discussed in functional terms.

I claim:
1. A radar system comprising:
   (a) first means for producing a first pulsed radar signal which is coupled to an antenna to transmit a radar beam having a predominant main beam and sidelobes;
   (b) a receiver coupled to an antenna to receive signals, having a frequency spectrum substantially equal to the frequency spectrum of said main beam;
   (c) second means for producing and transmitting a second pulsed radar signal having a power density which is at least substantially equal to the power density of said sidelobes of said radar beam and a frequency spectrum which at least includes the frequency spectrum of said first pulsed radar signal.
2. A radar system comprising:
   (a) a first radar transmitter coupled to an antenna to transmit a first frequency agile radar signal having a predominant main beam and sidelobes;
   (b) a second frequency agile radar transmitter coupled to a second antenna to transmit a second frequency agile radar signal, said second agile frequency radar signal having a power density which is at least substantially equal to the power density of said sidelobes and a frequency spectrum which includes the frequency spectrum of said first radar signal.
3. A radar system in accordance with claim 2 further including a circulator which couples the output signal of said first radar transmitter to said first antenna and couples said first antenna to said receiver.
4. A radar system in accordance with claim 2 further including a frequency controller coupled to said first and second radar transmitter to control the frequency of these transmitters.

* * * * *